United States Patent [19]

Nagai

[11] Patent Number: 5,379,151
[45] Date of Patent: Jan. 3, 1995

[54] MAGNETIC REPRODUCING DEVICE USING WINDOW PULSES TO EXTRACT ADDRESS INFORMATION

[75] Inventor: Michio Nagai, Saitama, Japan
[73] Assignee: Sony Corporation, Tokyo, Japan
[21] Appl. No.: 132,781
[22] Filed: Oct. 7, 1993

Related U.S. Application Data

[63] Continuation of Ser. No. 669,604, Mar. 14, 1991, abandoned.

[30] Foreign Application Priority Data

Mar. 15, 1990 [JP] Japan ............................ 2-065473

[51] Int. Cl.$^6$ .............................................. G11B 5/02
[52] U.S. Cl. ......................................... 360/018; 360/27; 360/72.1
[58] Field of Search ........................ 360/73.04, 18, 19.1, 360/72.1, 72.3, 77.15, 10.3, 27, 69, 75

[56] References Cited

U.S. PATENT DOCUMENTS

| | | | |
|---|---|---|---|
| 4,259,698 | 3/1981 | Takada | 360/70 |
| 4,594,621 | 6/1986 | Noguchi et al. | 360/70 |
| 4,716,473 | 12/1987 | Kondo | 360/73.04 |
| 4,811,120 | 3/1989 | Kashida et al. | 360/19.1 |
| 5,047,879 | 9/1991 | Fukatsu et al. | 360/73.04 |

*Primary Examiner*—Andrew L. Sniezek
*Assistant Examiner*—Varsha A. Kapadia
*Attorney, Agent, or Firm*—Jay H. Maioli

[57] ABSTRACT

A magnetic reproducing device such as a VTR, DAT, or the like reproduces recorded information from inclined tracks on a magnetic tape, having auxiliary information, such as address information, recorded in areas in the inclined tracks, includes a rotary magnetic head rotatable for successively scanning the tracks on the magnetic tape to generate a reproduced signal representative of the auxiliary information. A pulse signal is generated having pulses in synchronism with each rotation of the rotary magnetic head through a predetermined angle. Window pulses used subsequently to extract the auxiliary information in the areas from the reproduced signal are generated based on the pulse signal.

1 Claim, 3 Drawing Sheets

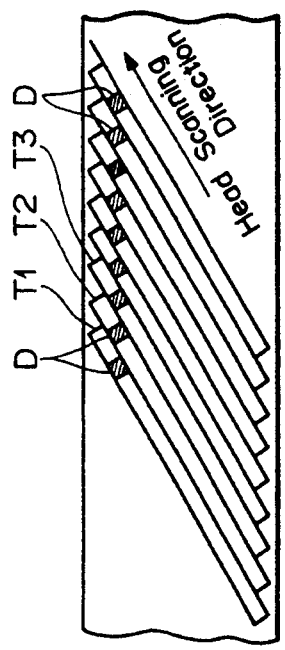
FIG. 3
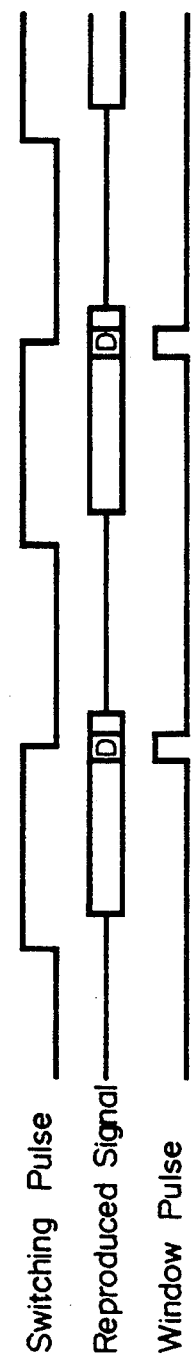
FIG. 4A  Switching Pulse
FIG. 4B  Reproduced Signal
FIG. 4C  Window Pulse
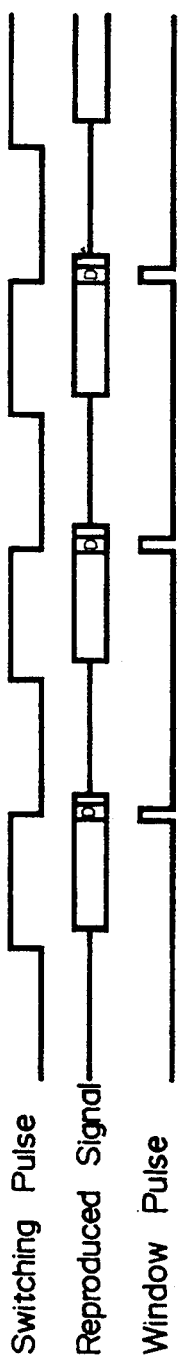
FIG. 5A  Switching Pulse
FIG. 5B  Reproduced Signal
FIG. 5C  Window Pulse

MAGNETIC REPRODUCING DEVICE USING WINDOW PULSES TO EXTRACT ADDRESS INFORMATION This is a continuation of application Ser. No. 07/669,604, filed Mar. 14, 1991, now abandoned.

BACKGROUND OF THE INVENTION

1. Field of the Invention

The present invention relates to a magnetic reproducing device with a rotary head drum, such as a video tape recorder, a digital audio tape recorder, or the like.

2. Description of the Prior Art

There are known helical-scan magnetic recording devices employing rotary head drums, such as video tape recorders (VTR), digital audio tape recorders (DAT), or the like.

The magnetic tape in such magnetic recording devices can usually be transported selectively at different speeds so that information can be recorded on the magnetic tape in different tape speed modes. When the tape speeds are changed to reproduce the recorded information in one of the tape speed modes, the speed at which the rotary head drum rotates is also varied so that the recorded information can properly be reproduced at the selected tape speed.

It is often customary to record auxiliary information such as address signals as well as main information such as video signals on magnetic tapes which are played back by helical-scan magnetic recording devices. Typically, as shown in FIG. 3 of the accompanying drawings, pieces of auxiliary information D are recorded in predetermined areas in successive inclined tracks T1, T2, T3, . . . on a magnetic tape by a rotary magnetic head on a rotary head drum.

When the recorded information is to be reproduced, the timing for a playback head to scan the areas where the pieces of auxiliary information D are recorded is detected, and the pieces of auxiliary information D are extracted with the detected timing. More specifically, switching pulses are generated in synchronism with rotation of the rotary head drum, as shown in FIG. 4A, each switching pulse being produced in one revolution of the rotary head drum. If the rotary head drum has two magnetic heads, then one of the magnetic heads produces a reproduced signal as shown in FIG. 4B. The reproduced signal contains the pieces of auxiliary information D at spaced time intervals. Window pulses shown in FIG. 4C are produced in timed relation to the pieces of auxiliary information D, and the pieces of auxiliary information D are extracted from the reproduced signal by the window pulses.

When the rotational speed of the rotary head drum is varied for the reproduction of the recorded information in another tape speed mode, it is necessary to vary the window pulses in timed relation to the rotational speed of the rotary head drum, as shown in FIGS. 5a–5C. Specifically, FIG. 5C shows window pulses which are produced when the rotational speed of the rotary head drum is about 1.5 times higher the normal rotational speed as shown in FIG. 4A. The magnetic head produces a reproduced signal as shown in FIG. 5B in timed relation to switching pulses as shown in FIG. 5A. At this time, the period of time which is required for the magnetic head to scan each track on the magnetic tape is shorter, as shown in FIG. 5B, than when the rotary head drum rotates at the normal rotational speed. The recorded pieces of auxiliary information D cannot be extracted unless the window pulses are produced in synchronism with the reproduced signal, as shown in FIG. 5C.

However, a complex circuit arrangement is needed to vary the window pulses in timed relation to the rotational speed of the rotary head drum. Thus, it has proven difficult to extract necessary auxiliary information from a reproduced signal when the rotational speed of the rotary head drum is varied.

OBJECTS AND SUMMARY OF THE INVENTION

It is an object of the present invention to provide a magnetic reproducing device of relatively simple arrangement which can extract a desired signal component from a reproduced signal when the rotational speed of a rotary head drum is varied.

According to the present invention, there is provided a magnetic reproducing device for reproducing recorded information from inclined tracks on a magnetic tape, the recorded information including auxiliary information recorded in areas in the inclined tracks, the magnetic reproducing device comprising a rotary magnetic head rotatable for successively scanning the tracks on the magnetic tape to generate a reproduced signal representative of the auxiliary information, means for generating a pulse signal in synchronism with rotation of the rotary magnetic head through a predetermined angle, and means for generating window pulses to extract the auxiliary information in the areas from the reproduced signal based on the pulse signal.

When the rotational speed of the rotary magnetic head is varied, the period of the pulse signal is also varied, and so is the period of the window pulses. Therefore, the auxiliary information can reliably and accurately be extracted from the reproduced signal using the window pulses irrespective of the rotational speed of the rotary magnetic head.

The above and other objects, features, and advantages of the present invention will become apparent from the following detailed description of an illustrative embodiment thereof to be read in conjunction with the accompanying drawings, in which like reference numerals represent the same or similar objects.

BRIEF DESCRIPTION OF THE DRAWINGS

FIG. 3 is a fragmentary view showing the manner in which successive inclined tracks are formed on a magnetic tape by a rotary magnetic head;

FIGS. 4A–4C represent is a timing chart of switching pulses, a reproduced signal, and window pulses in one tape speed mode respectively; and FIG. 5A–5C represent is a timing chart of switching pulses, a reproduced signal, and window pulses in another tape speed mode respectively.

DETAILED DESCRIPTION OF THE PREFERRED EMBODIMENT

Figure 1:
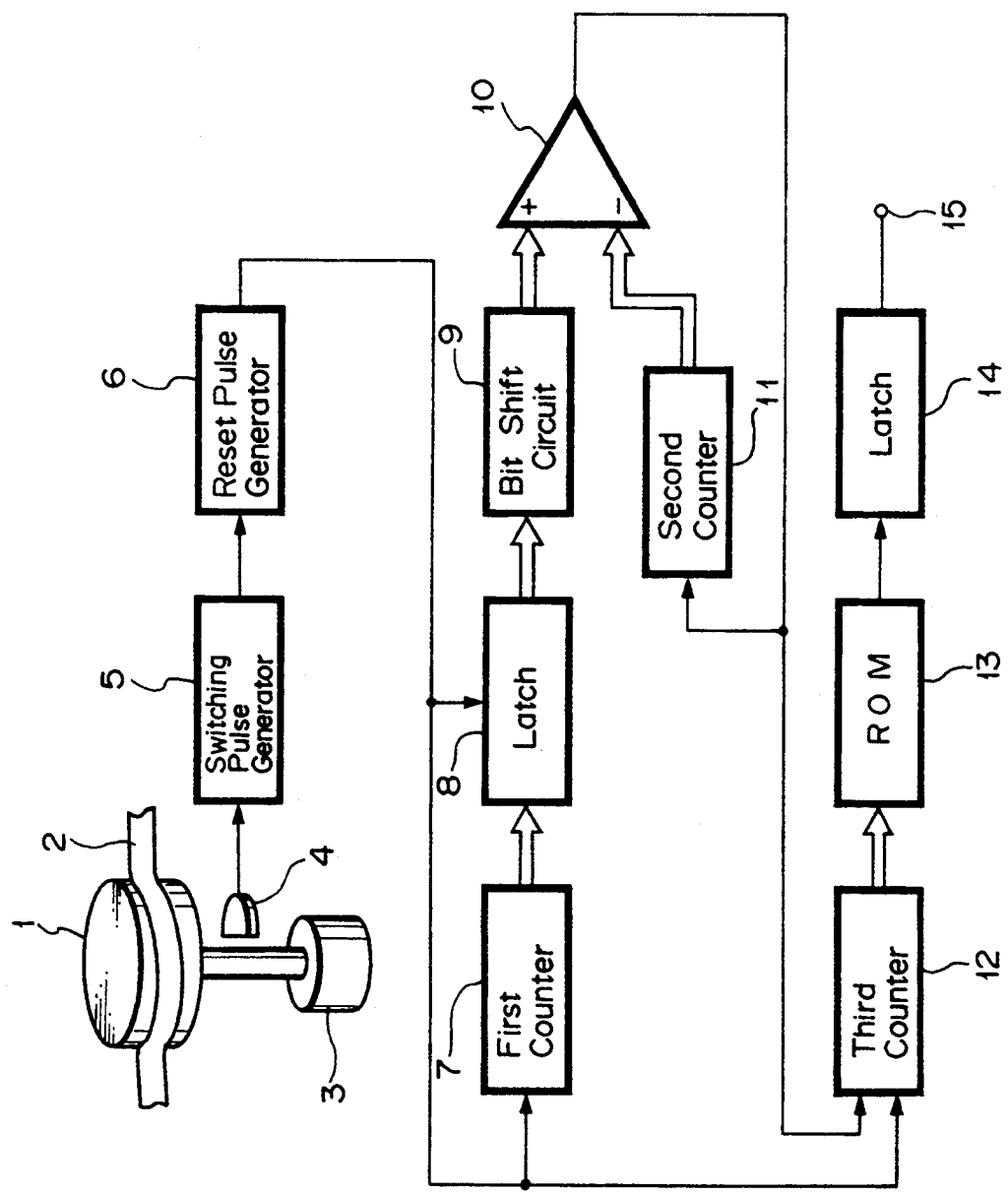
FIG. 1 is a block diagram of a magnetic reproducing device according to the present invention.

FIG. 1 shows in block form a magnetic reproducing device according to the present invention.

The magnetic reproducing device shown in FIG. 1 is incorporated in a helical-scan VTR employing a rotary head drum 1. The rotary head drum 1 supports a magnetic head (not shown) for reproducing a video signal recorded in successive inclined tracks on a magnetic video tape 2. The rotary head drum 1 is rotated by a spindle motor 3 which is associated with a pulse generator 4 that generates a pulse signal in synchronism with the rotational speed of the rotary head drum 1. Specifically, the pulse signal generated by the pulse generator 4 has a period corresponding to a certain angular displacement of the rotatable shaft of the rotary head drum 1, and the pulse signal has several pulses or periods each time the rotary head drum 1 makes one revolution.

The pulses produced by the pulse generator 4 are supplied to a switching pulse generator 5, which then generates a switching pulse signal that is inverted in level each time those pulse periods which correspond to a half revolution of the rotary head drum 1 are detected. More specifically, the switching pulse generator 5 generates a switching pulse based on the pulses from the pulse generator 4 each time the rotary head drum 1 makes a half revolution, the switching pulses having high or "1" levels alternating with low or "0" levels.

The switching pulses produced by the switching pulse generator 5 are then supplied to a reset pulse generator 6. The reset pulse generator 6 generates a pulse each time the switching pulse signal changes its level from the low level or "0" level to the high level or "1" level, i.e., at the positive-going edge of each switching pulse. Since the level of the switching pulse signal changes from the low level to the high level only once while the rotary head drum 1 makes one revolution, the reset pulse generator 6 generates one reset pulse while the rotary head drum 1 makes one revolution.

The reset pulses generated by the reset pulse generator 6 are supplied to a first counter 7. The first counter 7 counts clock pulses produced at a constant period by a clock generator (not shown). The count value of the first counter 7 is reset to 0 each time a reset pulse generated by the reset pulse generator 6 is supplied to the first counter 7.

The count output from the first counter 7 is supplied to a latch 8, which is also supplied with the reset pulses from the reset pulse generator 6. In synchronism with a supplied reset pulse, the latch 8 latches the count output from the first counter 7. Therefore, the latch 8 latches the maximum count value from the first counter 7 immediately before the first counter 7 is reset.

The latched output from the latch 8 is supplied to a bit shift circuit 9. The bit shift circuit 9 shifts the latched count value by several bits, reducing the number of bits thereof. After the count value has been thus shifted by a number of bits, the count data is compressed into data which is a fraction of the original count value depending on the number of bits by which it is shifted.

The bit shift circuit 9 supplies its output to one input terminal of a comparator 10. The other input terminal of the comparator 10 is supplied with the count output of a second counter 11. The comparator 10 compares the supplied data, and produces a pulse each time the count output of the second counter 11 becomes greater than the output from the bit shift circuit 9. The output pulses from the comparator 10 are supplied as reset pulses to the second counter 11, and also as clock pulses to a third counter 12.

The second counter 11 counts the clock pulses from the clock generator (not shown), and is reset by the output pulses from the comparator 10. The third counter 12 counts the output pulses from the comparator 10, and supplies its count output value to a ROM table 13. The reset pulses generated by the reset pulse generator 6 are also supplied to the third counter 12 to reset the count value of the third counter 12 to a predetermined initial count value. Therefore, after the third counter 12 is reset, it starts counting the comparator output pulses from the predetermined initial value.

The ROM table 13 stores output data corresponding respectively to count values of the third counter 12. The ROM table 13 produces an output signal of a high or "1" level when the third counter 12 produces a predetermined count value. The output signal from the ROM table 13 is supplied through a latch 14 to a window pulse output terminal 15, from which a window pulse is supplied to a circuit (not shown) which extracts auxiliary information from a reproduced signal.

Figure 2:
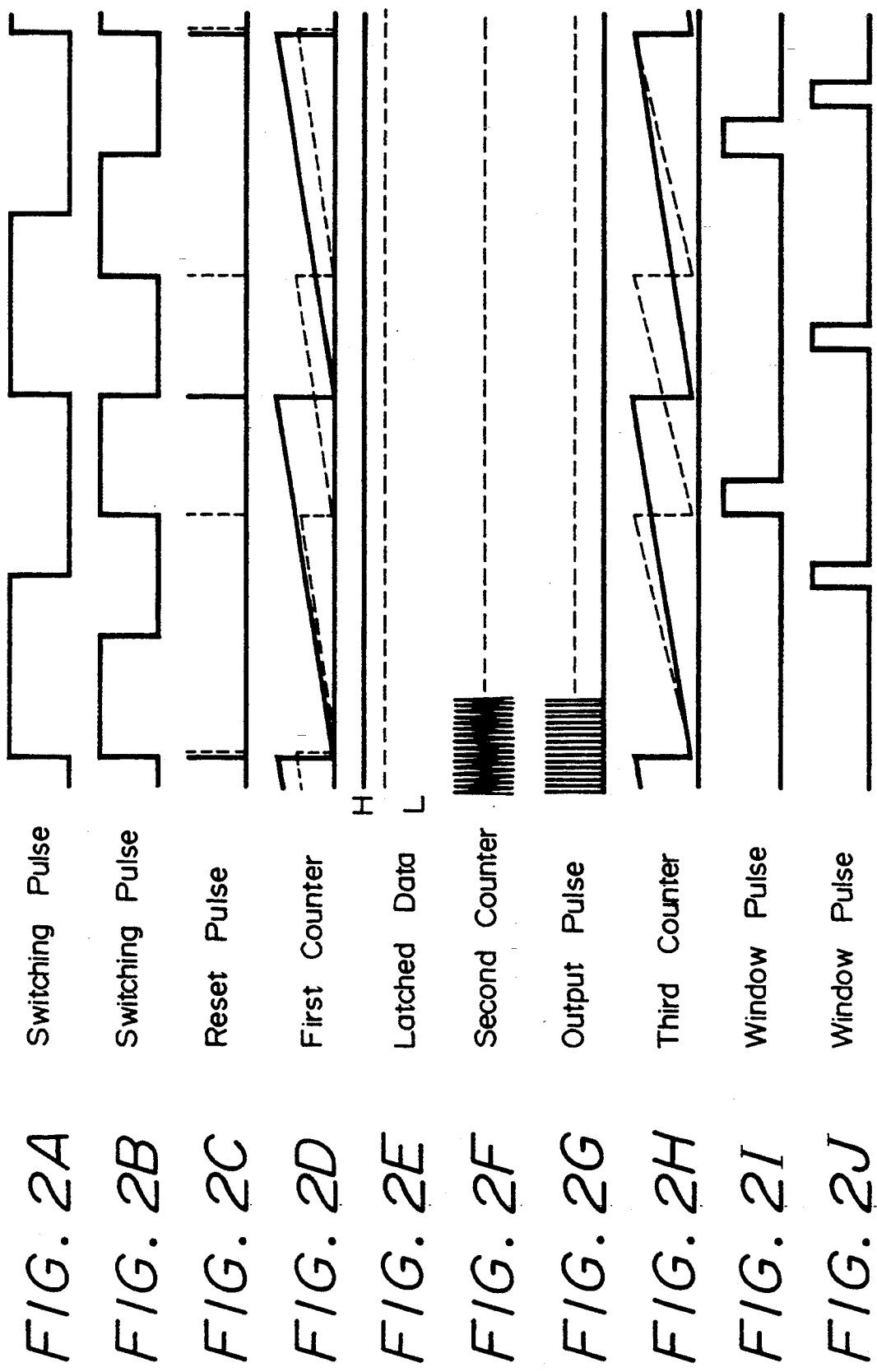
FIG. 2A–J is a timing chart of signals produced in the magnetic reproducing device.

Operation of the magnetic reproducing device shown in FIG. 1 will be described below with reference to FIG. 2A–2J. When the information recorded on the magnetic tape 2 is reproduced in a normal tape speed mode, switching pulses are generated by the switching pulse generator 5 as shown in FIG. 2A. The reset pulse generator 6 produces a reset pulse each time one switching pulse is generated, i.e., at the positive-going edge of each switching pulse, as shown in FIG. 2C. The first counter 7 successively counts clock pulses until it is supplied with a reset pulse from the reset pulse generator 6. Therefore, the count value of the first counter 7 is incremented at a constant rate until a reset pulse is supplied, as indicated by the solid line in FIG. 2D. The latch 8 latches the maximum count value as indicated by the solid line in FIG. 2E.

The number of times by which the count value of the second counter 11 is reset is determined depending on the extent to which the latched output from the latch 8 is compressed by the bit shift circuit 9. More specifically, when the latched output is compressed to a smaller value, the count value of the second counter 11 becomes greater than the compressed latched output for a larger number of times when they are compared with each other by the comparator 10, and hence the comparator 10 produces output pulses (see FIG. 2G) at a shorter period. Consequently, the count value of the second counter 2 is reset a greater number of times, and repeatedly increases and decreases with a relatively shorter period as shown in FIG. 2F.

The third counter 12 counts the pulses produced by the comparator 10. The count value of the third counter 12 increases at a constant rate until a reset pulse is supplied thereto from the reset pulse generator 6, as indicated by the solid-line curve in FIG. 2H.

When the third counter 12 reaches a predetermined count value, the ROM 13 generates a window pulse as shown in FIG. 2I. Since the third counter 12 starts counting pulses from the predetermined initial count value, the timing with which a window pulse is produced by the ROM table 13 can be adjusted or varied through the control of the predetermined initial count value.

In this manner, window pulses of a fixed duration are generated at a constant period based on the output pulses produced by the pulse generator 4 synchronously with the rotation of the rotary head drum 1. By suitably selecting the timing with which the window pulses are produced by the ROM table 13 through the control of the predetermined initial count value in the third counter 12, the pieces of auxiliary information D (see FIG. 3) recorded in the respective tracks can reliably be extracted from the reproduced signal based on the window pulses.

When the rotational speed of the rotary head drum 1 is varied to reproduce the recorded information in another tape speed mode, the magnetic reproducing device according to the present invention can produce appropriate window pulses for the extraction of auxiliary information from the reproduced signal. For example, if it is assumed that the rotational speed of the rotary head drum 1 is changed to a value that is 1.5 times the rotational speed in the above normal tape speed mode, the switching pulse generator 5 generates switching pulses at a period which is 1/1.5 (i.e., ⅔) of the period of the switching pulses in the normal tape speed mode. Therefore, the reset pulse generator 6 also produces reset pulses at a period which is ⅔ of the period of the reset pulses in the normal tape speed mode, as indicated by the broken lines in FIG. 2C. The first counter 7 is thus reset at a period that is ⅔ of the period at which it is reset in the normal tape speed mode. The maximum count value of the first counter 7 is ⅔ of that of the first counter 7 in the normal tape speed mode, and hence the value which is latched by the latch 8 is ⅔ of the value latched thereby in the normal tape speed mode as indicated by the broken line in FIG. 2E.

Likewise, the second counter 11 is reset at a period that is ⅔ of that of the first counter in the normal tape speed mode, and the period of output pulses from the comparator 10 is ⅔ of that of output pulses in the normal tape speed mode. The rate at which the count value of the third counter 12 is incremented is 1.5 times the rate in the normal tape speed mode as indicated by the broken line in FIG. 2H.

When the count value of the third counter 12 varies at a speed which is 1.5 times the speed in the normal tape speed mode, the ROM table 13 produces window pulses as shown in FIG. 2J. The window pulses are produced at a period that is ⅔ of the period of the window pulses in the normal tape speed mode (see FIG. 2I), and each have a pulse duration which is ⅔ of the pulse duration in the normal tape speed mode. Therefore, the window pulses generated at this time are commensurate with the varied rotational speed of the rotary head drum 1. Accordingly, the pieces of auxiliary information D can accurately be extracted from the reproduced information with the window pulses in this varied tape speed mode.

Since window pulses for extracting auxiliary information from certain areas of a reproduced signal vary with the rotational speed of the rotary head drum 1 in the magnetic reproducing device, as described above, the auxiliary information can reliably and accurately be extracted in different tape speed modes. Inasmuch as the window pulses are generated on the basis of the pulses produced by the pulse generator 4, the magnetic reproducing device is of a relatively simple circuit arrangement because any frequency generator for detecting the rotational period of the rotary head drum 1 is not required.

In the illustrated embodiment, window pulses for extracting auxiliary information are generated at a period commensurate with the rotational speed of the rotary head drum 1. However, window pulses for extracting other recorded information may also be generated in the same manner as described above.

Although a certain preferred embodiment has been shown and described, it should be understood that many changes and modifications may be made therein without departing from the scope of the appended claims.

I claim as my invention:

1. A magnetic reproducing device for reproducing recorded information from inclined tracks on a magnetic tape, the recorded information including auxiliary information recorded in predetermined areas in the inclined tracks, said magnetic reproducing device comprising:

a rotary magnetic head rotatable at a plurality of speeds for successively scanning the tracks on the magnetic tape to generate a reproduced signal representative of the auxiliary information;

means for generating a pulse signal in which each pulse is generated in synchronism with rotation of said rotary magnetic head through a predetermined angle; and means for generating a plurality of window pulses to extract the auxiliary information in said areas from the reproduced signal in response to said pulse signal;

wherein said means for generating window pulses comprises a first counter for counting clock pulses, a reset pulse generator for producing a reset pulse to reset said first counter in response to said pulse signal upon one revolution of said rotary magnetic head, and means for producing one of said plurality of window pulses so that said window pulses are controlled to enable extraction of the auxiliary information in said predetermined areas at any of said speeds;

wherein said means for producing one of said window pulses comprises:

a latch responsive to said reset pulse generator and said first counter for latching a maximum count value from said first counter;

a comparator having first and second input terminals;

means responsive to said latch and said first input terminal a signal proportional to said maximum count value;

a second counter for supplying a count value to said second input terminal of said comparator, said comparator producing a compared output pulse as an input to said second counter each time said second counter produces a count exceeding a value related to said maximum count value;

a third counter responsive to said reset pulse generator and said compared output pulse; and a ROM table storing window pulse data corresponding to respective counts in said third counter and being addressed by the count in said third counter.

* * * * *

UNITED STATES PATENT AND TRADEMARK OFFICE
CERTIFICATE OF CORRECTION

PATENT NO. : 5,379,151
DATED : January 3, 1995
INVENTOR(S) : Michio Nagai

It is certified that error appears in the above-indentified patent and that said Letters Patent is hereby corrected as shown below:

```
In the Abstract, line 3, after "tape" delete ","
Col. 1, line 58, change "5a" to --5A--
Col. 2, line 57, after "mode" insert --,--
        line 60, after "mode" insert --,--
Col. 4, line 18, change "FIG." to --FIGS.--

Col. 6, line 47, after "and" insert --supplying to--
```

Signed and Sealed this

Thirty-first Day of October 1995

Attest:

BRUCE LEHMAN

Attesting Officer        Commissioner of Patents and Trademarks